US008495908B2

(12) United States Patent  
Nagy

(10) Patent No.: US 8,495,908 B2
(45) Date of Patent: Jul. 30, 2013

(54) METHOD AND SYSTEM FOR SIMULATING VARIOUS ENGINE OPERATING CONDITIONS TO EVALUATE ENGINE EMISSIONS TEST EQUIPMENT

(75) Inventor: Donald B. Nagy, Canton, MI (US)

(73) Assignee: GM Global Technology Operations LLC

( * ) Notice: Subject to any disclaimer, the term of this patent is extended or adjusted under 35 U.S.C. 154(b) by 44 days.

(21) Appl. No.: 13/238,529

(22) Filed: Sep. 21, 2011

(65) Prior Publication Data

US 2013/0068002 A1    Mar. 21, 2013

(51) Int. Cl.
*G01M 15/10* (2006.01)
(52) U.S. Cl.
USPC ........................................... 73/114.13
(58) Field of Classification Search
USPC ............... 73/114.69, 114.71, 114.75, 116.02, 73/116.04, 116.05, 116.06
See application file for complete search history.

(56) References Cited

U.S. PATENT DOCUMENTS

| | | | | |
|---|---|---|---|---|
| 3,999,425 A | * | 12/1976 | Collin | 73/114.71 |
| 4,450,728 A | * | 5/1984 | D'Angelo et al. | 73/862.28 |
| 4,727,746 A | * | 3/1988 | Mikasa et al. | 73/23.31 |
| 5,105,651 A | * | 4/1992 | Gutmann | 73/23.31 |
| 6,085,582 A | * | 7/2000 | Tripathi et al. | 73/114.71 |
| 6,112,574 A | * | 9/2000 | Hirano et al. | 73/23.31 |
| 6,470,732 B1 | * | 10/2002 | Breton | 73/23.31 |
| 6,823,726 B1 | | 11/2004 | Nagy | |
| 7,140,874 B2 | * | 11/2006 | Ingalls et al. | 431/185 |
| 2004/0007056 A1 | * | 1/2004 | Webb et al. | 73/118.1 |
| 2004/0025580 A1 | * | 2/2004 | Webb et al. | 73/118.1 |
| 2006/0201239 A1 | * | 9/2006 | Webb et al. | 73/118.1 |

OTHER PUBLICATIONS

F.Stump, S.Tejada, F.Black and W.Ray, U.S. Environmental Protection Agency; W.Crews and R.Davis, ManTech Environmental Technology, Inc.; AIGER Cooperative Research and Devolpmet Agreement, PD/95-1; "Compoud Injection to Assure the Performance of Motor Vehicle Emissions Sampling Systems"; Aug. 1995; 17 pages.

* cited by examiner

Primary Examiner — Freddie Kirkland, III

(57) ABSTRACT

A system according to the principles of the present disclosure includes an engine control module, a valve control module, and a level determination module. The engine control module controls an engine mounted in one of an engine dynamometer and a chassis dynamometer based on a predetermined schedule specifying a desired speed with respect to time. The valve control module controls a valve to inject a first quantity of a substance into an exhaust system to simulate the engine outputting an emission. The level determination module determines an emissions level of the emission in the exhaust system based on the predetermined schedule and the first quantity.

20 Claims, 4 Drawing Sheets

METHOD AND SYSTEM FOR SIMULATING VARIOUS ENGINE OPERATING CONDITIONS TO EVALUATE ENGINE EMISSIONS TEST EQUIPMENT

FIELD

The present disclosure relates to methods and systems for simulating various engine operating conditions to evaluate engine emissions test equipment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Emissions test equipment measures levels of emissions in exhaust output by an engine. Emissions test equipment may be used to ensure that a vehicle complies with emissions standards. Emissions standards regulate the amount of emissions that a vehicle may produce. Emissions levels measured by the emissions test equipment must be accurate and repeatable to ensure that results of an emissions test are valid.

Systems and methods for evaluating the accuracy and reliability of emissions test equipment have been developed. These systems and methods typically inject substances into air flowing toward the emissions test equipment. The substances resemble emissions output by an engine, but the substances are injected from a source other than an engine. These systems and methods do not evaluate emissions test equipment under real-world conditions, and therefore do not evaluate emissions test equipment as accurately as desired.

SUMMARY

A system according to the principles of the present disclosure includes an engine control module, a valve control module, and a level determination module. The engine control module controls an engine mounted in one of an engine dynamometer and a chassis dynamometer based on a predetermined schedule specifying a desired speed with respect to time. The valve control module controls a valve to inject a first quantity of a substance into an exhaust system to simulate the engine outputting an emission. The level determination module determines an emissions level of the emission in the exhaust system based on the predetermined schedule and the first quantity.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
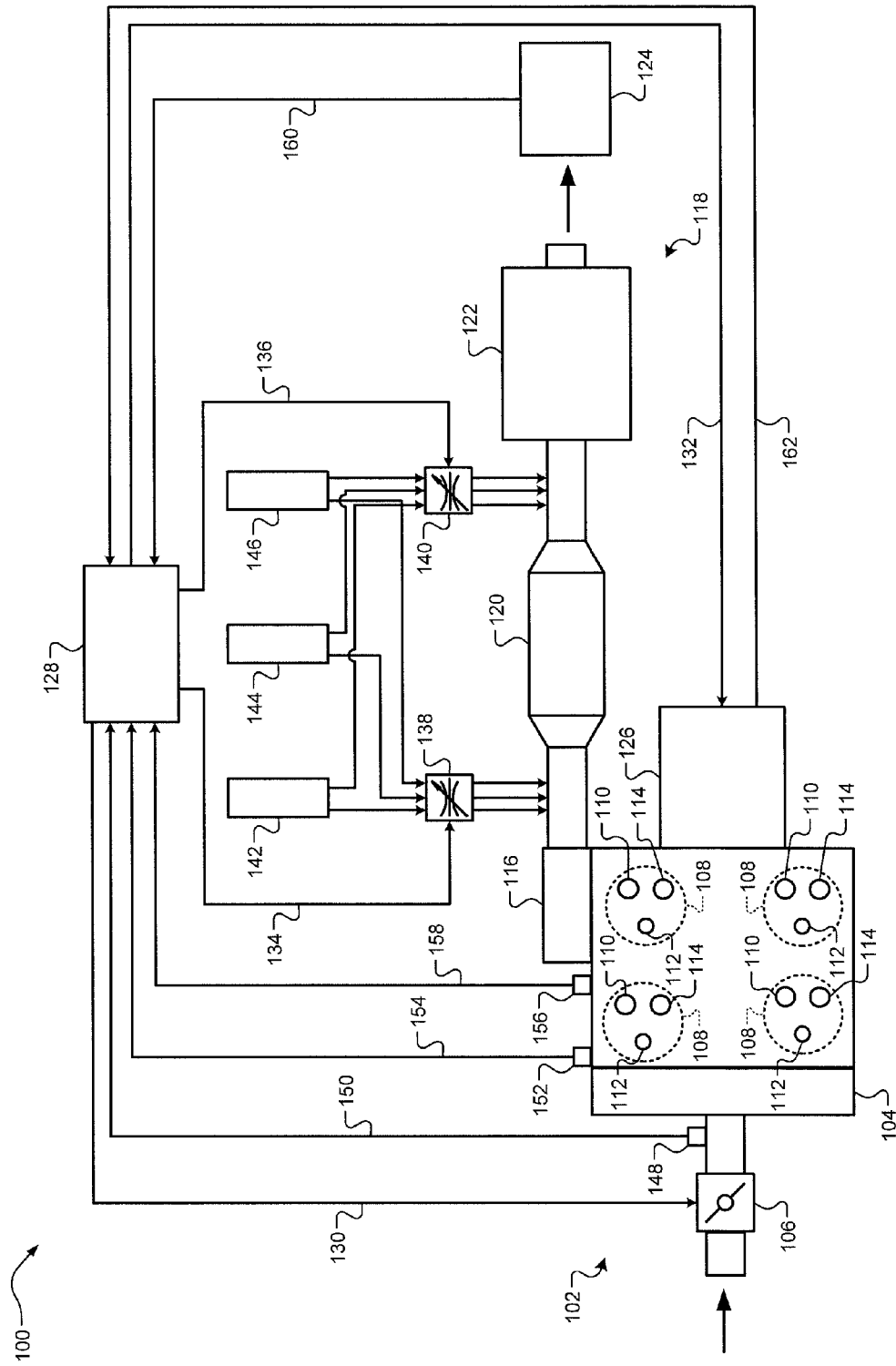
FIG. 1 is a functional block diagram of an emissions test system according to the principles of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A system and method according to the principles of the present disclosure simulates various engine operating conditions, such as a cold start or a hot start, to evaluate emissions test equipment. A cold start occurs when an engine is started after the engine has been shut down for a period (e.g., 12 to 24 hours) that allows the engine to cool down to the temperature of the surrounding air. The engine operating conditions are simulated by injecting one or more substances into an exhaust system of an engine while the engine is running. The substances may include a gas, a liquid (e.g., ethanol), and/or a solid (e.g., particulate matter). The engine may be controlled based on a predetermined schedule specifying a desired speed and/or a desired load. The engine may be mounted in a vehicle on a chassis dynamometer and the desired speed may be a wheel speed. Alternatively, the engine may be mounted on an engine dynamometer and the desired speed may be an engine speed.

Injecting substances to simulate engine operating conditions rather than simply operating an engine to simulate the engine operating conditions minimizes variability in emissions levels associated with the engine operating conditions. In turn, emissions levels in an exhaust system of an engine may be easier to determine, and evaluations of the emissions test equipment may be more consistent. Furthermore, substances may be injected to flush out emissions that may be present in an exhaust system after an engine is shutdown. Thus, a cold start may be simulated without waiting for the engine to cool down to the temperature of the surrounding air.

For some substances, such as hydrocarbon (HC) or carbon monoxide (CO), the quantity of the substances injected into the exhaust system may be large relative to the quantity of the substances output by the engine. Thus, variability in emissions level due to variability in the amount of emissions output by the engine may be negligible. For other substances, such as carbon dioxide ($CO_2$), the quantity of the substances output by the engine may be significantly greater. Thus, injecting a large quantity of the substances into the exhaust system relative to the quantity of the substances output by the engine may be impractical.

A system and method according to the principles of the present disclosure may determine a total mass of emissions output by the exhaust system during the predetermined schedule and adjust the total mass to account for engine emissions variability. The total mass may be adjusted based on a difference between the desired speed and an actual speed. The total mass may be adjusted based on a difference between a desired power output of the engine and an actual power output of the engine.

A system and method according to the principles of the present disclosure may inject a substance into the exhaust system to account for engine emissions variability instead of adjusting the total mass. The quantity of the substance injected may increase the total mass to a predetermined mass that is a predetermined percentage (e.g., 5 percent) greater than an average of the total mass observed during previous evaluations. The predetermined percentage may be greater than or equal to a variability of the total mass observed during previous evaluations. This ensures that the total mass is not greater than the predetermined mass. If the total mass is less than the predetermined mass, then the difference may be injected into the exhaust system.

Referring to FIG. 1, an engine system 100 includes an engine 102 that combusts air and fuel to produce torque. Air is drawn into an intake manifold 104 through a throttle 106. The throttle 106 regulates mass air flow into the intake manifold 104. Air within the intake manifold 104 is distributed into one or more cylinders 108. Although the engine 102 is depicted as having four cylinders, the engine 102 can include more or less cylinders.

A fuel injector (not shown) injects fuel that is combined with the air as it is drawn into the cylinder 108 through an intake port. The fuel injector may be an injector associated with an electronic or mechanical fuel injection system or a jet or port associated with a carburetor or another system for mixing fuel with intake air. The fuel injector is controlled to provide a desired air-to-fuel (A/F) ratio within the cylinder 108.

An intake valve 110 selectively opens and closes to enable the air/fuel mixture to enter the cylinder 108. A piston (not shown) compresses the air/fuel mixture within the cylinder 108. A spark plug 112 initiates combustion of the air/fuel mixture, driving the piston in the cylinder 108. The piston drives a crankshaft (not shown) to produce drive torque. Exhaust within the cylinder 108 is forced out of an exhaust port when an exhaust valve 114 is in an open position.

The exhaust flows through an exhaust manifold 116 and the exhaust is treated in an exhaust system 118. The exhaust system 118 includes a catalytic converter 120 and a muffler 122. The catalytic converter 120 reduces emissions in the exhaust. The muffler 122 reduces the amount of noise emitted by the exhaust. The exhaust system 118 may include multiple catalytic converters in various configurations (e.g., series and/or parallel). In addition, the exhaust system 118 may include other emissions reduction devices such as a diesel particulate filter (DPF) or a selective catalytic reduction (SCR) catalyst. Exhaust exiting the exhaust system 118 is analyzed by emissions test equipment 124. The emissions test equipment 124 measures emissions levels in the exhaust.

The engine 102 is mounted on a dynamometer 126. The dynamometer 126 may be an engine dynamometer that is coupled to the engine 102. Alternatively, the dynamometer 126 may be a chassis dynamometer, and the engine 102 may be mounted in a vehicle that is resting on the dynamometer 126. In either case, the dynamometer 126 applies a load on the engine 102 using, for example, electric motors.

A control module 128 outputs an engine control (EC) signal 130 to control the engine 102 and outputs a dynamometer control (DC) signal 132 to control the dynamometer 126. The control module 128 may control the engine 102 and the dynamometer 126 based on a predetermined schedule specifying a desired speed and/or a desired load with respect to time. If the dynamometer 126 is an engine dynamometer, the predetermined schedule may specify both a desired speed and a desired load, and the desired speed may be an engine speed. If the dynamometer 126 is a chassis dynamometer, the predetermined schedule may specify only a desired speed, and the desired speed may be a wheel speed. In addition, the control module 128 may control a driver interface (not shown) to display the desired speed, and a driver may control the throttle 106 to achieve the desired speed. Alternatively, the control module 128 may control the throttle valve 106 using a robot driver (not shown).

The control module 128 outputs valve control (VC) signals 134, 136 to control valves 138, 140, respectively. The control module 128 opens the valve 138 to inject a first substance 142, a second substance 144, and/or a third substance 146 upstream from the catalytic converter 120. The control module 128 opens the valve 140 to inject the first substance 142, the second substance 144, and/or the third substance 146 downstream from the catalytic converter 120. Each of the valves 138, 140 may include multiple valves to independently control injection of the substances 142, 144, 146. Additionally, the valves 138, 140 may be replaced with injectors or other devices capable of injecting the substances 142, 144, 146 into the exhaust system.

A sensor 148 outputs mass airflow (MAF) signal 150 indicating the mass flow rate of air flowing into the intake manifold 104. A sensor 152 outputs an engine coolant temperature (ECT) signal 154 indicating the temperature of coolant circulated through the engine 102. A sensor 156 outputs an engine speed (ES) signal 158 indicating the speed of the engine 102. Although the sensor 156 is shown mounted on the engine 102, the sensor 156 may be mounted on the dynamometer 126. The emissions test equipment 124 outputs an emissions level (EL) 160 signal indicating levels of emissions in the exhaust system 118. The dynamometer 126 outputs an engine torque (ET) signal 162 indicating the amount of torque produced by the engine 102. The ET signal 162 may indicate torque measured at the engine 102 or torque measured at a wheel (not shown). The control module 128 receives the MAF signal 150, the ECT signal 154, the ES signal 158, the EL signal 160, and the ET signal 162.

Figure 2:
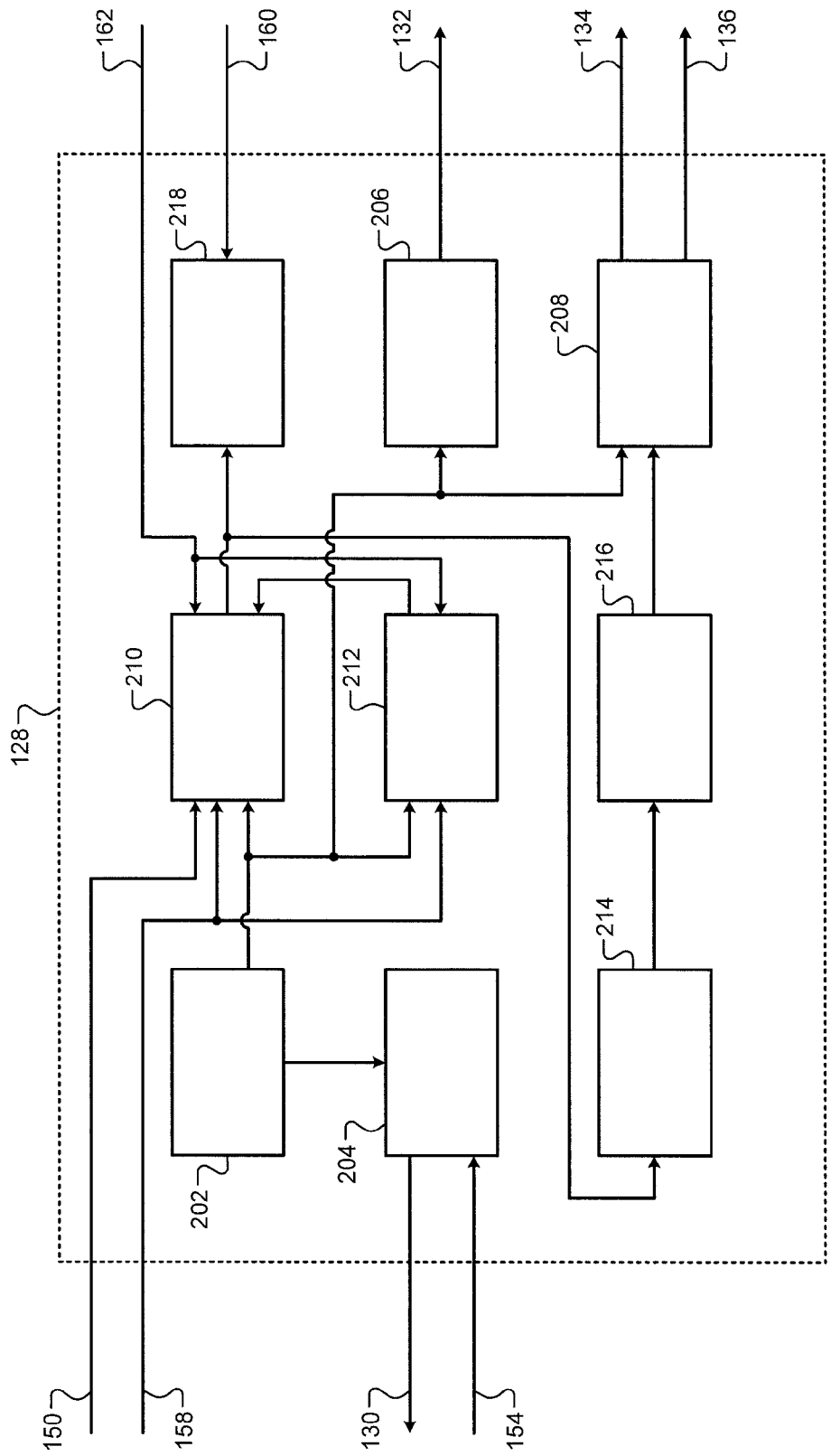
FIG. 2 is a functional block diagram of an emissions control system according to the principles of the present disclosure.

Referring to FIG. 2, the control module 128 includes various modules that simulate various engine operating conditions, such as a cold start or a hot start, to evaluate emissions test equipment. A simulation scheduling module 202 stores a predetermined schedule specifying the desired speed and/or the desired load with respect to time. The predetermined schedule may specify an engine state and a valve position with respect to time. The engine state indicates when to start or stop the engine 102. The valve position indicates when to open or close the valves 138, 140. The simulation scheduling module 202 outputs the predetermined schedule and/or parameters specified in the predetermined schedule.

An engine control module 204 may control the engine 102 based on the predetermined schedule. The engine control module 204 may start or stop the engine 102 based on an engine state specified in the predetermined schedule. The engine state may be specified with respect to time and/or with respect to the ECT signal 154. The engine control module 204 may control the speed of the engine 102 based on a desired speed specified in the predetermined schedule. The desired speed may be an engine speed or a wheel speed. The engine control module 204 may control the driver interface to display the engine state and/or the desired speed, and in response, the driver may start or stop the engine 102 and control the speed of the engine 102.

The engine control module 204 may control the speed of the engine 102 based on a desired torque specified in the predetermined schedule. The torque output by an engine coupled to a chassis dynamometer is typically a function of the wheel speed. The relationship between the wheel speed and the engine torque may be embodied in a lookup table and/or an equation. The engine control module 204 may use this relationship to control the speed of the engine 102 based on the desired torque. The engine control module 204 may output the EC signal 130 to control the engine 102.

The dynamometer control module 206 controls the load applied by the dynamometer 126 based on a desired load specified in the predetermined schedule. The dynamometer control module 206 outputs the DC signal 132 to control the dynamometer 126. The valve control module 208 opens or closes the valves 138, 140 based on a valve position specified in the predetermined schedule. The valve control module 208 outputs the VC signals 134, 136 to control the valves 138, 140.

A level determination module 210 determines levels of emissions output by the engine 102 and/or injected by the valves 138, 140. The emissions may include hydrocarbon, carbon oxide, carbon dioxide, nitrogen oxide, and/or ethanol. The level determination module 210 may determine the emissions levels based on a predetermined relationship between the predetermined schedule and the emissions levels. For example, the emissions levels may be related to the desired speed, the desired load, and/or the valve position. The predetermined relationship may be embodied in an equation and/or a lookup table. The level determination module 210 outputs the emissions levels.

The level determination module 210 may determine the emissions level based on an exhaust flow rate and one or more of a substance injection rate and an emissions production rate. The substance injection rate is a rate at which one or more of the substances 142, 144, 146 are injected into the exhaust system 118. The emissions production rate is a rate at which the engine 102 produces emissions. The level determination module 210 may determine the exhaust flow rate based on the MAF signal 150 and/or based on input received from a sensor (not shown) located in the exhaust system 118. The level determination module 210 may determine the substance injection rate based on the valve position. The level determination module 210 may determine the emissions production rate based on the desired speed and/or the desired load.

For some substances, such as hydrocarbon or carbon monoxide, the quantity of the substances injected into the exhaust system 118 may be large relative to the quantity of the substances output by the engine 102. Thus, variability in the emissions level due to variability in the amount of emissions output by the engine 102 may be negligible. For these substances, the level determination module 210 may determine the emissions level based on the quantity of the substances injected into the exhaust system 118 and independent from the amount of emissions output by the engine 102.

For other substances, such as carbon dioxide, the quantity of the substances output by the engine 102 may be significantly greater. Thus, injecting a large quantity of the substances into the exhaust system 118 relative to the quantity of the substances output by the engine 102 may be impractical. For these substances, the level determination module 210 may determine the emissions level based on the quantity of the substances injected into the exhaust system 118 and the amount of emissions output by the engine 102.

The level determination module 210 may adjust the emissions levels based on a difference between the desired speed and an actual speed. The actual speed may be an engine speed or a wheel speed. The actual speed may be determined based on the ES signal 158. Alternatively, the actual speed may be determined based on input received from a wheel speed sensor (not shown). The level determination module 210 may increase emissions levels when the actual speed is greater than the desired speed and decrease emissions levels when the actual speed is less than the desired speed.

The level determination module 210 may adjust the emissions levels based on a difference between a desired power output of the engine 102 and an actual power output of the engine 102. The level determination module 210 may adjust the emissions levels based on a difference between a desired energy output of the engine 102 and an actual energy output of the engine 102. The emissions levels may increase when the actual power or energy output is greater than the desired power or energy output and the emissions levels may decrease when the actual power or energy output is less than the desired power or energy output.

A power determination module 212 determines the desired power output of the engine 102 and the actual power output of the engine 102. The power determination module 212 determines the desired power output based on a desired speed and/or a desired torque specified in the predetermined schedule. If the dynamometer 126 is an engine dynamometer, the power determination module 212 may determine the actual power output based on the ES signal 158 and/or engine torque indicated by the ET signal 162. If the dynamometer 126 is a chassis dynamometer, the power determination module 212 may determine the actual power output based on output from the wheel speed sensor and/or wheel torque indicated by the ET signal 162. In this regard, the desired power output and the actual power output may be specified at the engine 102 or at the wheel. The level determination module 210 may integrate the desired power output and the actual power output with respect to time to determine the desired energy output and the actual energy output, respectively.

A mass determination module 214 determines an accumulated or total mass of emissions output by the exhaust system 118 during the predetermined schedule. The mass determination module 214 may determine the total mass based on the emissions level and the exhaust flow rate. The mass determination module 214 may determine an emissions flow rate based on a product of the emissions level and the exhaust flow rate and determine the total mass by integrating the emissions flow rate with respect to time. Thus, the total mass may be a product of the emissions level and the exhaust flow rate over a given period of time.

The mass determination module 214 may determine the total mass based on the emissions levels before the emissions levels are adjusted based on differences between desired parameters and actual parameters. The mass determination module 214 may then adjust the total mass based on the differences between the desired parameters and the actual parameters. Alternatively, the mass determination module 214 may determine the total mass based on the emissions levels after the emissions levels are adjusted based on differences between the desired parameters and the actual parameters. The mass determination module 214 outputs the total mass.

A quantity adjustment module 216 adjusts an injection quantity of substances such as carbon dioxide based on the total mass. The quantity adjustment module 216 may adjust the injection quantity based on a difference between the total mass and a predetermined mass. The predetermined mass may be a predetermined percentage (e.g., 5 percent) greater than an average of the total mass observed during previous evaluations. The predetermined percentage may be greater than or equal to a variability of the total mass observed during previous evaluations. This ensures that the total mass is not greater than the predetermined mass. If the total mass is less than the predetermined mass, then the difference may be injected into the exhaust system 118.

The mass determination module 214 may repeatedly determine the total mass and the quantity adjustment module 216 may repeatedly adjust the injection quantity during the predetermined schedule. Alternatively, the mass determination module 214 may determine the total mass and the quantity adjustment module 216 may adjust the injection quantity at periodic intervals. For example, the total mass may be determined and the injection quantity may be adjusted at the end of the predetermined schedule and/or at the end of a simulated engine operation condition such as a cold start or a hot start. The valve control module 208 controls the valves 138, 140 to adjust the injection quantity based on input received from the quantity adjustment module 216.

An equipment evaluation module 218 evaluates the emissions test equipment 124 based on the emissions levels determined by the level determination module 210 and the emissions levels measured by the emissions test equipment 124. The equipment evaluation module 218 receives the measured emissions level via the EL signal 160. The equipment evaluation module 218 may determine a measurement error based on the difference between the determined emissions level and the measured emissions level. The measurement error indicates the accuracy and reliability of the emissions test equipment 124.

The modules included in the control module 128 may be implemented separate from the control module 128. The modules included in the control module 128 may execute portions of the methods shown in FIGS. 3 and 4. Portions of the methods shown in FIGS. 3 and 4 may be combined. For illustration purposes only, the methods shown in FIGS. 3 and 4 are described in the context of the engine system 100 of FIG. 1.

Figure 3:
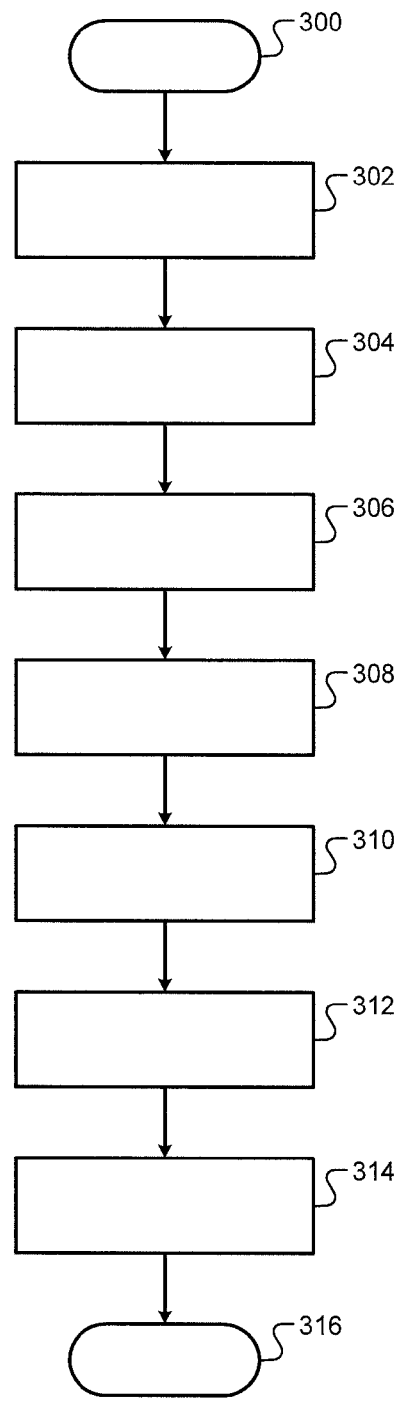
FIG. 3 is a first flowchart illustrating an emissions control method according to the principles of the present disclosure.
Figure 4:
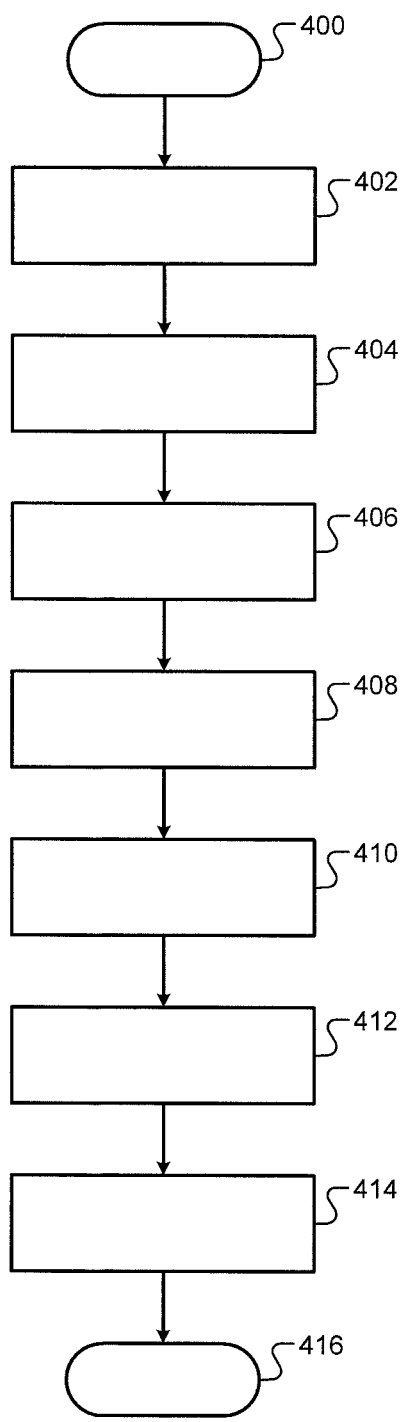
FIG. 4 is a second flowchart illustrating an emissions control method according to the principles of the present disclosure.

Referring to FIG. 3, a method for simulating various engine operating conditions, such as a cold start or a hot start, to evaluate emissions test equipment begins at 300. At 302, the method preconditions the engine system 100. The magnitude and variability of emissions output by a cold engine is greater than the magnitude and variability of emissions output by a warm or hot engine. Thus, the engine system 100 is preconditioned to ensure that the engine 102 is warm or hot, thereby reducing the magnitude and variability of emissions output by the engine 102.

The method may precondition the engine system 100 by operating the engine 102 until the temperature of the engine 102 is greater than or equal to a predetermined temperature. The temperature of the engine 102 may be determined based on the ECT signal 154. The predetermined temperature is greater than a normal resting temperature of the engine system 100. For example, the resting temperature of the engine system 100 may be 75 degrees Fahrenheit (° F.), or about 24 degrees Celsius (° C.). The engine 102 may be operated for a predetermined period that ensures the temperature of the engine 102 is greater than or equal to a predetermined temperature. At 304, the method stops the engine 102.

At 306, the method injects the first substance 142 into the exhaust system 118. The first substance 142 is injected into the exhaust system 118 to flush out emissions that may be present in the exhaust system 118. In turn, the method may simulate a cold start without waiting for a period (e.g., 12 to 24 hours) that allows the engine 102 to cool down to the temperature of the surrounding air. In addition, the cold start may be simulated when the engine 102 is warm or hot such that the magnitude and variability of emissions output by the engine 102 are reduced (e.g., near zero).

The first substance 142 may be injected into the exhaust system 118 upstream from the catalytic converter 120 and/or downstream from the catalytic converter 120. A larger quantity of the first substance 142 may be injected downstream from the catalytic converter 120 than upstream from the catalytic converter 120. The first substance 142 may be a predetermined concentration of dry-treated pure air or ambient air. In addition, the first substance 142 may be heated. However, the temperature of the first substance 142 may be less than the temperature of the catalytic converter 120.

At 308, the method restarts the engine 102. At 310, the method controls the engine 102 based on a predetermined schedule. The predetermined schedule may specify a desired speed with respect to time. The desired speed may be an engine speed or a wheel speed. The predetermined schedule may specify a desired load with respect to time and the dynamometer 126 may be controlled based on the desired load.

At 312, the method injects the second substance 144 into the exhaust system 118. The second substance 144 may be injected into the exhaust system 118 to simulate a cold start. The second substance 144 may be injected upstream from the catalytic converter 120 and/or downstream from the catalytic converter 120.

The cold start may be simulated via the chemical makeup of the second substance 144 and/or via a spike in emissions caused by restarting the engine 102. To simulate a cold start, the second substance 144 may include predetermined amounts of hydrocarbon and carbon monoxide. Since these amounts are known and, due to the preconditioning at 302, the amount of emissions output by the engine 102 is low relative to these amounts, the amount of emissions output by the exhaust system 118 may be accurately determined.

At 314, the method injects the third substance 146 into the exhaust system 118. The third substance 146 may be injected into the exhaust system 118 to simulate a hot start. The third substance 146 may be injected upstream from the catalytic converter 120 and/or downstream from the catalytic converter 120. The method may refrain from injecting the third substance 146 for a predetermined period after the second substance 144 is injected.

The hot start may be simulated due to the chemical makeup of the third substance 146. As with the second substance 144, the third substance 146 may include predetermined amounts of hydrocarbon and carbon monoxide. However, a cold start may involve a spike in emissions for a brief period (e.g., 20 seconds), while a hot start may involve low levels of emissions gradually decreasing to zero. Thus, the predetermined amounts included in the third substance 146 may be less than the predetermined amounts included in the second substance 144. Since the amounts injected are known and the engine 102 produces near-zero emissions after the engine 102 is preconditioned and restarted, the amount of emissions output by the exhaust system 118 may be accurately determined. The method ends at 316.

The method may simulate a cold start without simulating a hot start by refraining from injecting the third substance 146. The method may simulate a hot start without simulating a cold start by refraining from injecting the second substance 144 and refraining from injecting the third substance 146 for a predetermined period after the engine 102 is started. The method may inject other substances and may simulate engine operating conditions other than a cold start or a hot start. For example, the other substances may include a liquid (e.g., ethanol) and/or a solid (e.g., particulate matter).

Referring to FIG. 4, a method for simulating various engine operating conditions while accounting for differences between desired and actual parameters begins at 400. The method may determine levels of emissions, such as carbon dioxide, that are output by an engine in large quantities relative to levels of other emissions produced. Injecting a large quantity of these substances into an exhaust system relative to the quantity of these emissions output by an engine may be impractical. Thus, the method accounts for differences between desired parameters specified in a predetermined schedule and actual parameters determined based on measurements.

At 402, the method controls the engine 102 based on the predetermined schedule. The predetermined schedule may specify a desired speed with respect to time. The desired speed may be an engine speed or a wheel speed. The predetermined schedule may specify a desired load with respect to time, and the method may control the dynamometer 126 based on the desired load.

At 404, the method injects a first quantity of a substance such as carbon dioxide into the exhaust system 118. The first quantity may be predetermined and/or may be specified in the predetermined schedule. The first quantity may be configured to simulate an engine operating condition such as a cold start or a hot start.

At 406, the method determines a level of emissions output by the engine 102 based on the predetermined schedule. The method may determine the emissions level based on a predetermined relationship between the predetermined schedule and the emissions level. For example, the emissions level may be related to a desired speed and/or a desired load or torque. The predetermined relationship may be embodied in an equation and/or a lookup table.

At 408, the method determines a total mass of emissions output by the exhaust system 118 based on the first quantity of the substance injected into the exhaust system 118 and the level of emissions output by the engine 102. The method may determine a second quantity of emissions output by the engine 102 by integrating the emissions level with respect to time. The method may determine the total mass based on a sum of the first quantity and the second quantity.

At 410, the method adjusts the total mass of emissions output by the exhaust system 118 to account for differences between desired and actual parameters. The method may adjust the total mass based on a difference between a desired speed specified in the predetermined schedule and an actual speed determined based on measurements. The actual speed may be determined based on the ES signal 158 or based on output from the wheel speed sensor.

The method may adjust the total mass based on a difference between a desired power output of the engine 102 and an actual power output of the engine 102. The desired power output may be determined based on a desired speed and/or a desired torque specified in the predetermined schedule. The actual power output may be determined based on the actual speed and/or an actual torque. The actual torque may be determined based on output from the dynamometer 126.

The method may adjust the total mass based on a predetermined relationship between the actual parameters and the emissions levels or the total mass. For example, the emissions level or the total mass may be related to the actual speed and/or the actual power output. The predetermined relationship may be identical to the relationship used to determine the emissions level based on the desired parameters.

At 412, the method adjusts the first quantity of the substance injected into the exhaust system 118 to account for differences between desired and actual parameters. The method may adjust the first quantity instead of adjusting the total mass of emissions output by the exhaust system 118. For example, if the actual speed is less than the desired speed, the method may inject an additional amount of the substance instead of decreasing the total mass to account for the difference in emission levels.

The method may adjust the first quantity to increase the total mass to a predetermined mass that is a predetermined percentage (e.g., 5 percent) greater than an average of the total mass observed during previous evaluations. The predetermined percentage may be greater than or equal to a variability of the total mass observed during previous evaluations to ensure the total mass is less than the predetermined mass. If the total mass is less than the predetermined mass, the method may inject the difference into the exhaust system 118. The method may repeatedly determine the total mass and repeatedly adjust the first quantity during the predetermined schedule.

At 414, the method evaluates the emissions test equipment 124. The method may determine a measurement error based on a difference between a total mass determined based on the desired and/or actual parameters and a total mass determined based on output from the emissions test equipment 124. At 416, the method ends.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
   an engine control module that controls an engine mounted in one of an engine dynamometer and a chassis dynamometer based on a predetermined schedule specifying a desired speed with respect to time;
   a valve control module that controls a valve to inject a first quantity of a substance into an exhaust system to simulate the engine outputting an emission; and
   a level determination module that determines an emissions level of the emission in the exhaust system based on the predetermined schedule and the first quantity.

2. The system of claim 1, wherein the engine is mounted in the engine dynamometer, the desired speed is an engine speed, and the predetermined schedule specifies an engine load with respect to time.

3. The system of claim 1, wherein the engine is mounted in a vehicle on the chassis dynamometer and the desired speed is a wheel speed.

4. The system of claim 1, wherein the substance includes at least one of a liquid substance, a solid substance, and carbon dioxide.

5. The system of claim 1, wherein the level determination module adjusts the emissions level based on a difference between the desired speed and an actual speed.

6. The system of claim 1, further comprising a power determination module that determines a desired power output of the engine based on the desired speed and that determines an actual power output of the engine based on an actual speed.

7. The system of claim 6, wherein the level determination module adjusts the emissions level based on a difference between the desired power output and the actual power output.

8. The system of claim 1, further comprising a mass determination module that determines a total mass of emissions output by the exhaust system during the predetermined schedule.

9. The system of claim 8, wherein the mass determination module determines the total mass based on the emissions level and an actual speed.

10. The system of claim 9, further comprising a quantity adjustment module that adjusts the first quantity to increase the total mass to a predetermined mass.

11. A method comprising:
    controlling an engine mounted in one of an engine dynamometer and a chassis dynamometer based on a predetermined schedule specifying a desired speed with respect to time;
    controlling a valve to inject a first quantity of a substance into an exhaust system to simulate the engine outputting an emission; and
    determining an emissions level of the emission in the exhaust system based on the predetermined schedule and the first quantity.

12. The method of claim 11, wherein the engine is mounted in the engine dynamometer, the desired speed is an engine speed, and the predetermined schedule specifies an engine load with respect to time.

13. The method of claim 11, wherein the engine is mounted in a vehicle on the chassis dynamometer and the desired speed is a wheel speed.

14. The method of claim 11, wherein the substance includes at least one of a liquid substance, a solid substance, and carbon dioxide.

15. The method of claim 11, further comprising adjusting the emissions level based on a difference between the desired speed and an actual speed.

16. The method of claim 11, further comprising determining a desired power output of the engine based on the desired speed and determining an actual power output of the engine based on an actual speed.

17. The method of claim 16, further comprising adjusting the emissions level based on a difference between the desired power output and the actual power output.

18. The method of claim 11, further comprising determining a total mass of emissions output by the exhaust system during the predetermined schedule.

19. The method of claim 18, further comprising determining the total mass based on the emissions level and an actual speed.

20. The method of claim 19, further comprising adjusting the first quantity to increase the total mass to a predetermined mass.

* * * * *